(12) United States Patent
Grammer et al.

(10) Patent No.: US 8,797,307 B2
(45) Date of Patent: Aug. 5, 2014

(54) PROJECTION DEVICE

(75) Inventors: Christian Grammer, Traitsching (DE); Jens Richter, Lappersdorf (DE); Claus Seibert, Schwaikheim (DE)

(73) Assignee: OSRAM AG, Munich (DE)

( * ) Notice: Subject to any disclaimer, the term of this patent is extended or adjusted under 35 U.S.C. 154(b) by 149 days.

(21) Appl. No.: 13/551,639

(22) Filed: Jul. 18, 2012

(65) Prior Publication Data

US 2013/0027372 A1     Jan. 31, 2013

(30) Foreign Application Priority Data

Jul. 28, 2011    (DE) .......................... 10 2011 079 985

(51) Int. Cl.
| | |
|---|---|
| *G09G 5/00* | (2006.01) |
| *H04N 9/31* | (2006.01) |
| *G02B 27/10* | (2006.01) |
| *G02B 27/18* | (2006.01) |
| *G03B 33/06* | (2006.01) |
| *G03B 21/20* | (2006.01) |
| *G02B 27/00* | (2006.01) |
| *G03B 33/12* | (2006.01) |

(52) U.S. Cl.
CPC .......... *G02B 27/0068* (2013.01); *H04N 9/3161* (2013.01); *G02B 27/1033* (2013.01); *G02B 27/18* (2013.01); *G03B 33/06* (2013.01); *H04N 9/3185* (2013.01); *G02B 27/10* (2013.01); *G03B 21/2033* (2013.01); *H04N 9/3194* (2013.01); *G03B 33/12* (2013.01); *H04N 9/3164* (2013.01)
USPC .................. 345/207; 345/7; 353/69; 359/443

(58) Field of Classification Search
USPC ...................... 345/7, 207; 353/69, 70, 94–98; 359/360–364, 383, 385, 443
See application file for complete search history.

(56) References Cited

U.S. PATENT DOCUMENTS

| | | | |
|---|---|---|---|
| 2007/0024824 A1* | 2/2007 | Damera-Venkata et al. | ... 353/94 |
| 2010/0149497 A1 | 6/2010 | Drumm et al. | |
| 2011/0176068 A1 | 7/2011 | Miller | |
| 2013/0335796 A1* | 12/2013 | Rosen et al. | ..................... 359/30 |

* cited by examiner

*Primary Examiner* — Jennifer Nguyen

(57) ABSTRACT

Various embodiments relate to a projection device for projecting useful data onto a projection surface. In this case, a first laser device generates radiation having a first wavelength and a second laser device generates radiation having a second wavelength. The spots of the respective beams are detected by a sensor device and fed to a drive device for the laser devices. Said drive device temporally shifts the drive signals relative to one another in such a way that a horizontal distance between the spots is minimized. Various embodiments furthermore relate to a corresponding method for projecting useful data.

17 Claims, 3 Drawing Sheets

PROJECTION DEVICE

CROSS-REFERENCE TO RELATED APPLICATION

This application claims priority to German Patent Application Serial No. 10 2011 079 985.0, which was filed Jul. 28, 2011, and is incorporated herein by reference in its entirety.

TECHNICAL FIELD

Various aspects of this disclosure relate to a projection device for projecting useful data onto a projection surface including a drive device having a first input for coupling to a source for the useful data to be projected, at least one first output for providing a drive signal at a first wavelength, and at least one second output for providing a drive signal at a second wavelength. The projection device may furthermore include at least one first laser device for emitting radiation having the first wavelength, wherein the first laser device is coupled to the first output of the drive device, at least one second laser device for emitting radiation having the second wavelength, wherein the second laser device is coupled to the second output of the drive device, and at least one sensor device including at least one first photosensitive element configured to detect radiation having the first wavelength, and at least one second photosensitive element configured to detect radiation having the second wavelength, wherein the at least one sensor device includes at least one output coupled to at least one second input of the drive device. It furthermore relates to a corresponding method for projecting useful data on a projection surface.

BACKGROUND

Various embodiments are explained hereinafter on the basis of the example of a projection device which is based on the so-called "flying spot method". However, it is also applicable to other projection devices. Referring to FIG. 1, in the so-called "flying spot method", by means of a two-dimensional micromirror 10, the laser beams from three laser devices 12a, 12b, 12c, which emit red, blue and green light respectively, which is added by means of a beam adding device 14, are deflected and projected onto an image plane 16. The image information is generated by intensity modulation of the three laser light sources 12a, 12b, 12c synchronously with the deflection of the mirror 10. One problem in the construction of a system of this type consists in carrying out the mechanical mounting of the lenses required for beam shaping, which are arranged between the laser devices 12a, 12b, 12c and the beam adding device 14 (not illustrated in FIG. 1), exactly in such a way that the laser beams are accurately superimposed at a defined distance.

This procedure results in a high manufacturing time per system, since adjustment is effected "actively" in this case, that is to say that the laser devices 12a, 12b, 12c have to be driven during lens mounting in such a way that the signals of the three laser devices 12a, 12b, 12c on the display surface 16, the so-called spots, are superimposed. The outlay in respect of machinery also causes high costs, since the adjustment accuracy of the machines for lens positioning has to be in the μm range.

There are then two effects which lead to a misalignment of the spot superimposition and cause a reduction of the contrast, which is associated with an impairment of the image quality of the projection device. A first effect is based on temperature fluctuations during operation, as a result of which the optical system can be altered in such a way that exact beam superimposition can no longer be achieved. A second effect additionally occurs over the lifetime of the projection device. Even if the spots are accurately superimposed at the time of manufacture, it cannot be ruled out that a permanent displacement of the laser spots relative to one another gradually occurs as a result of heating and cooling cycles.

SUMMARY

Various embodiments relate to a projection device for projecting useful data onto a projection surface. In this case, a first laser device generates radiation having a first wavelength and a second laser device generates radiation having a second wavelength. The spots of the respective beams are detected by a sensor device and fed to a drive device for the laser devices. Said drive device temporally shifts the drive signals relative to one another in such a way that a horizontal distance between the spots is minimized. Various embodiments furthermore relate to a corresponding method for projecting useful data.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
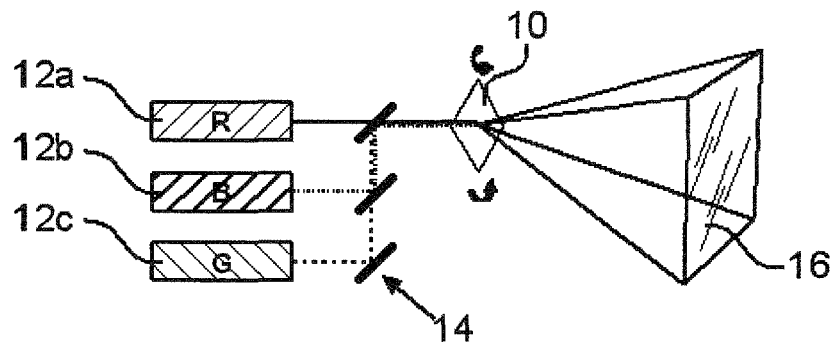
FIG. 1 shows in schematic illustration a conventional projection device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various aspects of this disclosure develop a projection device of the generic type and a method of the generic type in such a way that the highest possible image quality can be provided independently of temperature fluctuations over the entire lifetime of a projection device of this type.

Various aspects of this disclosure are based on the fundamental insight that the horizontal position of the RGB spots with respect to one another can be influenced by different temporal driving. The accuracy within a line is limited only by the temporal resolution capability of the drive device. In other words, this means that the smaller the time unit with which the laser devices can be driven, the more accurately the spots in a line can be superimposed. According to various embodiments, precautions are taken to provide this superimposition automatically by virtue of the fact that at least one sensor device is provided by means of which at least the relative horizontal position of the RGB spots with respect to one another can be determined. The drive device is configured, for its part, to correspondingly change the drive signals in a manner dependent on the relative horizontal position determined, such that the spots are superimposed as far as possible.

In a projection device according to various embodiments, therefore, the sensor device may include a multiplicity of first and second photosensitive elements arranged for determining at least one horizontal position of radiation having the first wavelength relative to a horizontal position of radiation having the second wavelength, wherein the drive device is configured to determine a first horizontal distance from the horizontal position of radiation having the first wavelength and the horizontal position of radiation having the second wavelength, wherein the drive device is furthermore configured to temporally shift the first and second drive signals relative to one another in a manner dependent on the first horizontal distance determined.

According to various embodiments, the drive device may be configured to temporally shift the first and second drive signals relative to one another in a manner dependent on the first horizontal distance determined in such a way that the first horizontal distance is minimized. This increases the contrast and, on account thereof, likewise the image quality of the projection device.

According to various embodiments, the sensor device may include at least one first matrix having a multiplicity of first photosensitive elements which is arranged in the beam path of radiation of the first laser device, and a second matrix having a multiplicity of second photosensitive elements, which is arranged in the beam path of radiation of the second laser device. By using matrices of this type, it is possible to detect the position of the spots of radiation having the respective wavelength with high accuracy, such that a minimization of the horizontal distance is made possible particularly precisely.

The projection device furthermore may include a beam adding device which is configured and arranged in such a way that it adds at least radiation portions of at least the first and the second laser device, wherein the sensor device is arranged at the output of the beam adding device, wherein the sensor device includes a matrix including a multiplicity of at least first and second photosensitive elements. In various embodiments, first and second photosensitive elements are accordingly combined in a matrix, such that it is possible to direct at least some of the laser beams added by means of a beam adding device into said matrix. In this way, the determination of a horizontal distance between the spots can be effected with even higher precision, since the calibration of separate matrices can be dispensed with.

In various embodiments, the matrix or the matrices may be constructed in rows and columns. Alternatively, the matrix or the matrices may also be embodied in circle-segmented fashion.

The projection device may furthermore include at least one first lens device arranged between the first laser device and the sensor device and at least one second lens device arranged between the second laser device and the sensor device. By means of lens devices of this type, the laser beam can be shaped, such that, for example, the beams emerge in the desired propagation, i.e. geometry, from the corresponding lens device.

In this context, the projection device may furthermore include an optical element for beam combining, in particular a prism, having at least one first beam splitter arranged in the beam path of the first laser device, and a second beam splitter arranged in the beam path of the second laser device wherein the optical element for beam combining is arranged between the respective lens device and the sensor device. In this way it is possible simultaneously to use one portion of the respective radiation for projecting useful data on the projection surface, while another portion of the radiation is used for determining the horizontal distance between the spots. This makes it possible to correct the horizontal distance in ongoing operation.

In this context, the optical element for beam combining preferably has an output, at which at least portions of the radiation of the first laser device and portions of the radiation of the second laser device can be provided. A deflection unit, in particular a micromirror or a 2-mirror system, by means of which the useful data are then projected onto the projection surface, can then be arranged at said output.

In various embodiments, the multiplicity of first and second photosensitive elements of the sensor device may furthermore be arranged in order to determine a vertical position of radiation having the first wavelength relative to a vertical position of radiation having the second wavelength, wherein the drive device is configured to determine a first vertical distance from the vertical position of radiation having the first wavelength and the vertical position of radiation having the second wavelength, wherein the drive device is furthermore configured to vary the first and the second drive signals in a manner dependent on the first vertical distance determined. This embodiment takes account of the circumstance that, by means of the matrices used in various embodiments, it becomes possible not only to determine the horizontal distance between spots, but also to determine a vertical distance. If the latter exceeds half an image line, it is also possible to reduce the vertical distance for the purpose of increasing the contrast to a range of less than or equal to half an image line. In this case, the drive device is preferably configured in a manner dependent on the first vertical distance determined to read out lines of the useful data to be projected, which are stored in an image memory, for the first and second drive signals from the image memory in such a way that the first vertical distance is minimized.

While only a projection device including at least one first and one second laser device has been mentioned in the above description of various embodiments in order to simplify understanding and for reduction to the essential aspect, various embodiments are usually implemented with at least one first, one second and one third laser device, wherein the third laser device is configured to emit radiation having a third wavelength. As a result, a so-called RGB system can be realized, wherein the explanations, measures and advantages stated hereinbefore with regard to the first and second laser devices and the radiation thereof correspondingly apply with regard to the third laser device. As a result, therefore, according to the invention it is possible to provide a projection device with an RGB system, in which both the horizontal distance between the RGB spots and the vertical distance between the RGB spots are minimized. As a result, a projection device is obtained which has an extremely high image quality, which can be provided independently of temperature fluctuations over the lifetime of the projection device.

In various embodiments, accordingly, the first wavelength is in the red spectral range, the second wavelength is in the green spectral range, and the third wavelength is in the blue spectral range. It goes without saying that applications are conceivable in which wavelengths can be in the infrared or ultraviolet range, for example, if required in the case of the application of the projection device.

The embodiments presented with regard to the projection device according to various embodiments, and their advantages correspondingly hold true, insofar as applicable, for the method according to various embodiments.

The same reference signs are used hereinafter for identical and identically acting components. In particular, the reference signs introduced with reference to FIG. 1 also continue to be used for a projection device according to various embodiments.

Figure 2:
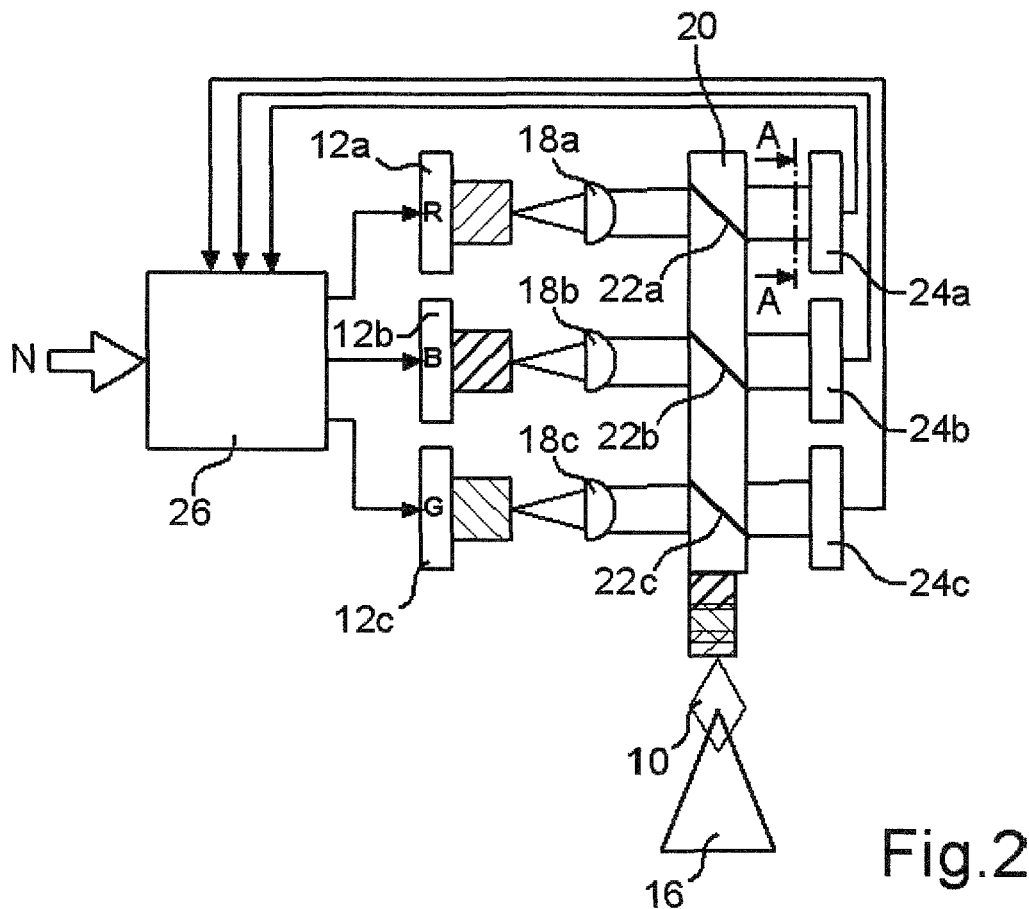
FIG. 2 shows in schematic illustration a projection device according to various embodiments.

FIG. 2 shows in schematic illustration various embodiments of a projection device. In this case, the radiation emerging from the laser devices 12a to 12c is fed via a respective lens device 18a, 18b, 18c to a prism 20, wherein a beam splitter 22a to 22c is arranged in the respective beam path. Part of the radiation is fed to a micromirror 10, from where it is projected onto the projection surface 16. A smaller portion of the radiation is respectively fed to a photodiode matrix 24a to 24c. Each photodiode matrix 24a to 24c has an output coupled to a drive device 26, which, on the output side, drives the laser devices 12a to 12c and into which, on the input side, the useful data N are fed.

Instead of photodiode matrices 24a to 24c, it is also possible to use other photosensitive sensitive elements, for example phototransistors.

Figure 3:
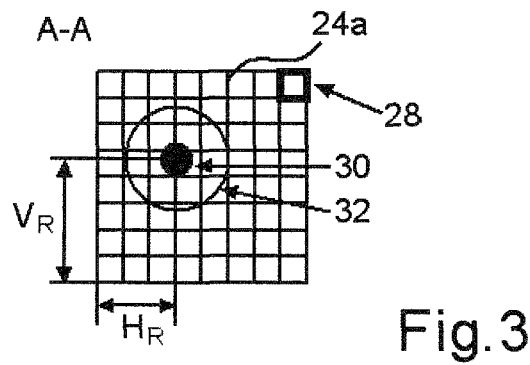
FIG. 3 shows a photodiode matrix that can be used in various embodiments.

FIG. 3 shows various embodiments of a photodiode matrix 24a constructed in rows and columns. An individual photodiode cell is denoted by 28. The center 30 of the spot and the Gaussian distribution 32 of the spot can be determined on the photodiode matrix. For the subsequent evaluations, e.g. the center 30 of the spot is of relevance and is designated in a simplified manner as spot. Accordingly, the position of the spot 30 can be determined by means of the photodiode matrix 24a. This has the coordinates $H_R$ and $V_R$ in the example—a photodiode matrix sensitive to light in the red wavelength range is considered.

Figure 4:
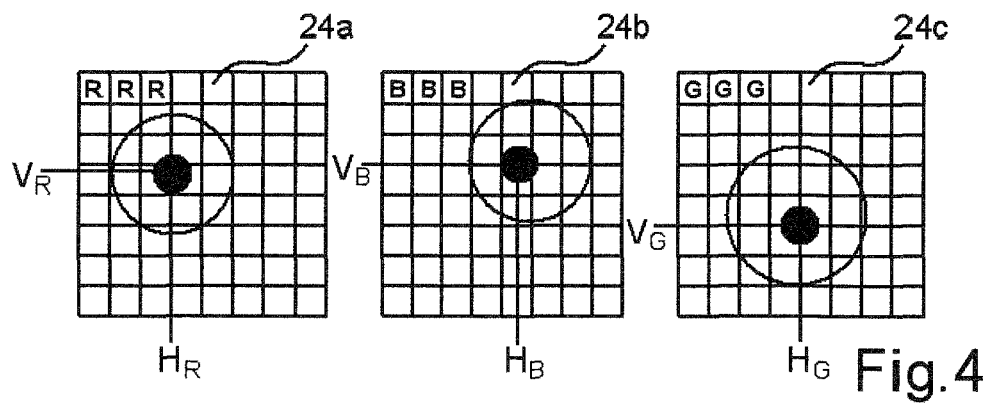
FIG. 4 shows a plurality of photodiode matrices for different wavelength ranges.

FIG. 4 furthermore shows the position of the blue and green spots on the corresponding photodiode matrices 24c and 24b. Accordingly, the red spot has coordinates $H_R$, $V_R$, the green spot has the coordinates $H_G$, $V_G$ and the blue spot has the coordinates $H_B$, $V_B$. A horizontal distance H1 between the green and red spots is accordingly $H_G$-$H_R$, a horizontal distance H2 between the green and the blue spots is $H_B$-$H_G$ and a horizontal distance H3 between the red and blue spots is $H_B$-$H_R$.

With regard to the vertical distances, the distance V1 between the red and green spots is $V_R$-$V_G$, the vertical distance V2 between the blue and green spots is $V_B$-$V_G$ and the vertical distance V3 between the blue and red spots is $V_B$-$V_R$. The drive device 26, to which the output signals of the photodiode matrices 24a to 24c are fed, determines the horizontal distances H1 to H3 and temporally shifts the drive signals fed to the laser devices 12a to 12c in such way that the horizontal distances are minimized. This is possible in a simple manner by virtue of the fact that the useful signal data N fed to the respective laser device 12a to 12c are output in a manner exhibiting different temporal delay. What can be achieved by a temporal delay of this type is, for example, that the horizontal coordinates $H_R$, $H_G$ correspond to the horizontal coordinate $H_B$. The spots thus lie at the same location with regard to their horizontal position.

The requirement made of the positioning accuracy of the lenses is reduced as a result of this regulation. The spots may be superimposed by adaptation of the temporal driving of the individual channels with the single calibration of the system at the time of manufacture. This may result in a low outlay in respect of costs of the positioning system. A time-consuming active adjustment of the lenses for beam superimposition is not necessary since a passive mounting of the lenses is totally sufficient for spot positioning. Manufacturing time can thereby be saved. Temperature fluctuations of the system or of the laser devices which lead to the displacement of the lenses or of the beam can be compensated for in a simple manner during operation, since the positions of the spots are determined continuously on the respective photodiode matrix. This results in a high temperature stability of a projection device of this type. Permanent displacement of the lens system can be compensated for by the readjustment and the image quality is maintained over the lifetime of the equipment.

Figure 5:
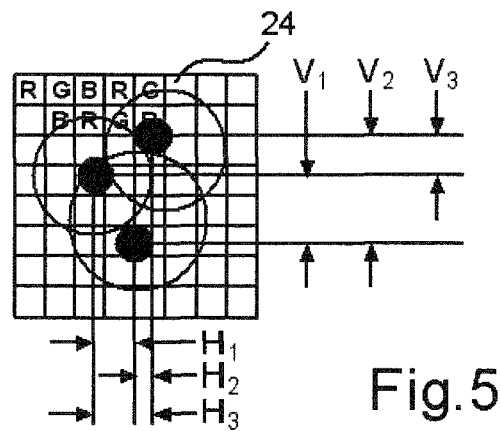
FIG. 5 shows a combined photodiode matrix for different wavelength ranges.

If use is made of a matrix as illustrated in FIG. 5, the individual elements of which are sensitive to different wavelength ranges, then it is furthermore possible to save space and reduce the number of components. In various embodiments of a projection device as illustrated in FIG. 2, therefore, it suffices to position an individual beam splitter in the output signal of the prism 20.

Figure 6:
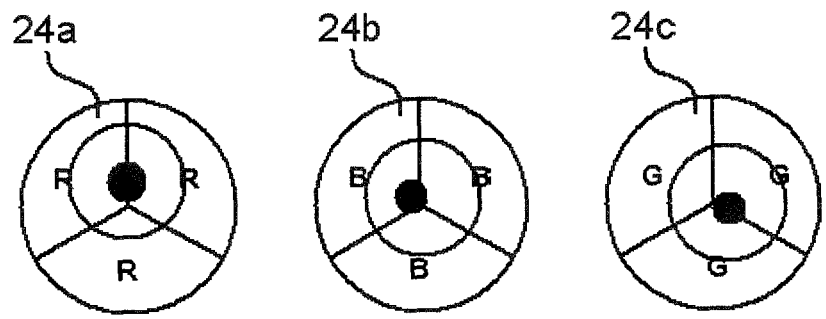
FIG. 6 shows segmented photodiode matrices for different wavelength ranges.

FIG. 6 shows various embodiments in which the three photodiode matrices 24a to 24c are embodied in a circle-segmented fashion. As a result of the different intensity distribution on the segments of the photodiode matrix, a conclusion about the position of the beam on the respective photodiode matrix can be drawn from the ratio of the segment currents with respect to one another.

Figure 7:
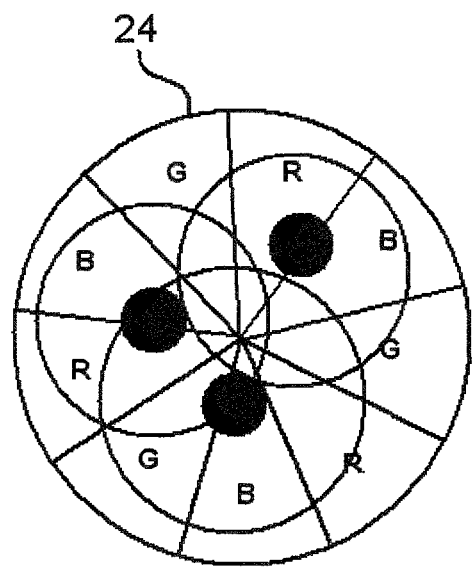
FIG. 7 shows a combined segmented photodiode matrix for different wavelength ranges.

Finally, FIG. 7 shows a circle-segmented photodiode matrix 24, which is sensitive to different wavelengths. This gives rise to the same advantages as in the case of the photodiode matrix 24 in accordance with FIG. 5.

By evaluating the vertical distances V1, V2, V3, see FIG. 5, in the drive device 26, the drive device 26 can perform the read-out of the lines of the useful data to be projected in such a way that the vertical distances V1, V2, V3 are likewise minimized. By way of example, for driving the blue laser device 12b, the (n+1)-th line can already be read out with respect to an image memory in which the useful data are stored, while the n-th line is read out for the driving of the red and green laser devices 12a, 12c at this point in time.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A projection device for projecting useful data onto a projection surface, the projection device comprising:
   a drive device having
      a first input for coupling to a source for the useful data to be projected;
      at least one first output for providing a drive signal at a first wavelength; and
      at least one second output for providing a drive signal at a second wavelength;
   at least one first laser device configured to emit radiation having the first wavelength, wherein the first laser device is coupled to the first output of the drive device;
   at least one second laser device configured to emit radiation having the second wavelength, wherein the second laser device is coupled to the second output of the drive device; and
   at least one sensor device comprising at least one first photosensitive element configured to detect radiation having the first wavelength, and at least one second photosensitive element configured to detect radiation having the second wavelength, wherein the at least one sensor device comprises at least one output coupled to at least one second input of the drive device;
   wherein the sensor device comprises a multiplicity of first and second photosensitive elements arranged for determining at least one horizontal position of radiation having the first wavelength relative to a horizontal position of radiation having the second wavelength, wherein the drive device is configured to determine a first horizontal distance from the horizontal position of radiation having the first wavelength and the horizontal position of radiation having the second wavelength,
   wherein the drive device is furthermore configured to temporally shift the first and second drive signals relative to one another in a manner dependent on the first horizontal distance determined.

2. The projection device as claimed in claim 1,
   wherein the drive device is configured to temporally shift the first and second drive signals relative to one another in a manner dependent on the first horizontal distance determined in such a way that the first horizontal distance is minimized.

3. The projection device as claimed in claim 1,
   wherein the sensor device comprises at least one first matrix having a multiplicity of first photosensitive elements which is arranged in the beam path of radiation of the first laser device, and a second matrix having a multiplicity of second photosensitive elements, which is arranged in the beam path of radiation of the second laser device.

4. The projection device as claimed in claim 3,
   wherein the matrix is embodied in circle-segmented fashion.

5. The projection device as claimed in claim 1,
   wherein the projection device comprises a beam adding device which is configured and arranged in such a way that it adds at least radiation portions of at least the first and the second laser device, wherein the sensor device is arranged at the output of the beam adding device, wherein the sensor device comprises a matrix comprising a multiplicity of at least first and second photosensitive elements.

6. The projection device as claimed in claim 1,
   wherein the matrix is constructed in the form of rows and columns.

7. The projection device as claimed in claim 1,
   wherein the projection device furthermore comprises at least one first lens device arranged between the first laser device and the sensor device and at least one second lens device arranged between the second laser device and the sensor device.

8. The projection device as claimed in claim 7,
   wherein the projection device furthermore comprises an optical element for beam combining having at least one first beam splitter arranged in the beam path of the first laser device, and a second beam splitter arranged in the beam path of the second laser device wherein the optical element for beam combining is arranged between the respective lens device and the sensor device.

9. The projection device as claimed in claim 8,
   wherein the optical element for beam combining is a prism.

10. The projection device as claimed in claim 1,
    wherein the optical element for beam combining has an output, at which at least portions of the radiation of the first laser device and portions of the radiation of the second laser device can be provided.

11. The projection device as claimed in claim 10,
    wherein a deflection unit is arranged at the output of the optical element for beam combining.

12. The projection device as claimed in claim 11,
    wherein the deflection unit is one of a micromirror and a 2-mirror system.

13. The projection device as claimed in claim 1,
    wherein the multiplicity of first and second photosensitive elements of the sensor device are furthermore arranged in such a way for determining a vertical position of radiation having the first wavelength relative to a vertical position of radiation having the second wavelength, wherein the drive device is configured to determine a first vertical distance from the vertical position of radiation having the first wavelength and the vertical position of radiation having the second wavelength, wherein the drive device is furthermore configured to vary the first and the second drive signals in a manner dependent on the first vertical distance determined.

14. The projection device as claimed in claim 1,
    wherein the drive device is configured in a manner dependent on the first vertical distance determined to read out lines of the useful data to be projected, which are stored in an image memory, for the first and second drive signals from the image memory in such a way that the first vertical distance is minimized.

15. The projection device as claimed in claim 1,
    wherein a third laser device is furthermore provided for emitting radiation having a third wavelength.

16. The projection device as claimed in claim 15,
    wherein the first wavelength is in the red spectral range, the second wavelength is in the green spectral range, and the third wavelength is in the blue spectral range.

17. A method for projecting useful data onto a projection surface by means of a projection device comprising a drive device having a first input for coupling to a source for the useful data to be projected; having at least one first output for providing a drive signal at a first wavelength; having at least one second output for providing a drive signal at a second wavelength; at least one first laser device configured to emit radiation having the first wavelength, wherein the first laser device is coupled to the first output of the drive device; at least one second laser device configured to emit radiation having the second wavelength, wherein the second laser device is coupled to the second output of the drive device; at least one sensor device comprising at least one first photosensitive element configured to detect radiation having the first wavelength, and at least one second photosensitive element configured to detect radiation having the second wavelength, wherein the at least one sensor device comprises at least one output coupled to at least one second input of the drive device;
the method comprising:
at least the horizontal position of radiation having the first wavelength relative to the horizontal position of radiation having the second wavelength is determined;
a first horizontal distance is determined from the horizontal position of radiation having the first wavelength and the horizontal position of radiation having the second wavelength; and
the first and second drive signals are temporally shifted relative to one another in a manner dependent on the first horizontal distance determined.

* * * * *

UNITED STATES PATENT AND TRADEMARK OFFICE
CERTIFICATE OF CORRECTION

| | | |
|---|---|---|
| PATENT NO. | : 8,797,307 B2 | Page 1 of 1 |
| APPLICATION NO. | : 13/551639 | |
| DATED | : August 5, 2014 | |
| INVENTOR(S) | : Gammer et al. | |

It is certified that error appears in the above-identified patent and that said Letters Patent is hereby corrected as shown below:

On the title page item (75), Inventor "Christian Grammer" should read as follows:

--Christian Gammer--

Signed and Sealed this
Fourteenth Day of April, 2015

Michelle K. Lee
*Director of the United States Patent and Trademark Office*